(12) United States Patent
Yemul et al.

(10) Patent No.: US 11,381,410 B1
(45) Date of Patent: Jul. 5, 2022

(54) DYNAMIC MEDIA SWITCHING BETWEEN DIFFERENT DEVICES OF SAME USER BASED ON QUALITY OF SERVICE AND PERFORMANCE

(71) Applicant: Avaya Management L.P., Durham, NC (US)

(72) Inventors: Nitinkumar Yemul, Pune (IN); Dinesh Mude, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/207,122

(22) Filed: Mar. 19, 2021

(51) Int. Cl.
  H04L 12/18  (2006.01)
  H04L 65/80  (2022.01)
  H04M 3/56  (2006.01)
  H04L 65/403  (2022.01)

(52) U.S. Cl.
  CPC ...... *H04L 12/1827* (2013.01); *H04L 12/1831* (2013.01); *H04L 65/403* (2013.01); *H04L 65/80* (2013.01); *H04M 3/568* (2013.01)

(58) Field of Classification Search
  CPC . H04L 12/1827; H04L 65/80; H04L 12/1831; H04L 65/403; H04M 3/568
  See application file for complete search history.

(56) References Cited

U.S. PATENT DOCUMENTS

| | | | | |
|---|---|---|---|---|
| 2007/0286347 | A1* | 12/2007 | Moore | H04M 3/18 379/1.01 |
| 2010/0260074 | A1* | 10/2010 | Blouin | H04M 3/2236 370/260 |
| 2011/0225247 | A1* | 9/2011 | Anantharaman | H04L 65/80 709/206 |
| 2012/0051533 | A1* | 3/2012 | Byrne | H04M 3/568 379/204.01 |
| 2012/0308044 | A1* | 12/2012 | Vander Mey | H04L 12/1822 381/104 |
| 2013/0301810 | A1* | 11/2013 | Dunne | H04L 65/80 379/32.01 |
| 2014/0093053 | A1* | 4/2014 | Kanevsky | H04M 3/2227 379/32.01 |

(Continued)

OTHER PUBLICATIONS

Schulzrinne et al. "RTP: A Transport Protocol for Real-Time Applications," The Internet Society, Jul. 2003, RFC 3550, 115 pages.

*Primary Examiner* — Nicholas R Taylor
*Assistant Examiner* — Tania M Pena-Santana
(74) *Attorney, Agent, or Firm* — Sheridan Ross P.C.

(57) ABSTRACT

A method includes identifying a plurality of communication devices assigned to a same participant to a conference call, evaluating a quality-of-service for each of the plurality of communication devices assigned to the same participant to the conference call and designating one of the plurality of communication devices as a principal communication device of the plurality of communication devices assigned to the same participant to the conference call based on the evaluation of the quality-of-service of the plurality of communication devices. The method also includes automatically muting a remainder of the plurality of communication devices not designated as the principal communication device and reevaluating the quality-of-service for each of the plurality of communication devices.

20 Claims, 9 Drawing Sheets

(56) References Cited

U.S. PATENT DOCUMENTS

| | | | |
|---|---|---|---|
| 2015/0139043 A1* | 5/2015 | Grevers, Jr. | H04L 12/1827 370/260 |
| 2017/0180558 A1* | 6/2017 | Li | H04L 65/1089 |
| 2020/0110572 A1* | 4/2020 | Lenke | G06T 7/20 |
| 2021/0195325 A1* | 6/2021 | Edry | H04M 3/568 |

* cited by examiner

| Device ID | QOS Parameters Weight for Device | Device selected Audio IN/OUT |
|---|---|---|
| Laptop | 70 | Yes |
| Wired Phone | 55 | No |
| iPad | 40 | No |
| Mobile (Cellular Network) | 60 | No |
| Mobile (WiFi) | 60 | No |

FIG. 6

| Device ID | QOS Parameters Weight for Device | Device selected Audio IN/OUT |
|---|---|---|
| Laptop | 70 | No |
| Wired Phone | 55 | No |
| iPad | 40 | No |
| Mobile (Cellular Network) | 80 | Yes |
| Mobile (WiFi) | 60 | No |

FIG. 8

DYNAMIC MEDIA SWITCHING BETWEEN DIFFERENT DEVICES OF SAME USER BASED ON QUALITY OF SERVICE AND PERFORMANCE

FIELD OF THE DISCLOSURE

The disclosure relates generally to systems and methods for communication conferencing and particularly to systems and methods for improving the manageability of multiple devices of a participant to a conference call.

BACKGROUND

The outbreak of the Covid-19 pandemic has forced the world to stay isolated at home. Individuals in many instances have started to work from home and this has resulted in the increased use of voice/video conferencing and collaboration applications. Due to this increased reliance on digital solutions, many Internet users around the world have suffered from reduced Internet service or no Internet service at all. Therefore, many Internet users have started acquiring backup Internet services and connections for high-speed availability. Unfortunately, even if the user (e.g., participant to a conference call) has multiple devices connected to different service providers during the conference call, if one device or connection fails, the participant is disconnected from the conference call until another device or connection takes over for the disconnected device or connection. Moreover, during the conference call where the participant is connected via more than one device, the participant must manually mute-mic/speaker-off from all but one of the devices to prevent other conference participants from hearing echoing sounds. Accordingly, it is difficult for the participant to the conference call to manage multiple devices to prevent echoing and dropped connections during a conference call.

SUMMARY

These and other needs are addressed by the various embodiments and configurations of the present disclosure. The present disclosure can provide a number of advantages depending on the particular configuration. These and other advantages will be apparent from the disclosure contained herein. In one embodiment, a method used in dynamic media switching between different communication devices of a same participant to a conference call based on quality-of-service and performance in managing the conference call is disclosed that includes identifying, by a processor, a plurality of communication devices assigned to a same participant to a conference call and evaluating, by the processor, a quality-of-service for each of the plurality of communication devices assigned to the same participant to the conference call. The method also includes designating, by the processor, one of the plurality of communication devices as a principal communication device of the plurality of communication devices assigned to the same participant to the conference call based on the evaluation of the quality-of-service of the plurality of communication devices and automatically muting, by the processor, a remainder of the plurality of communication devices not designated as the principal communication device. The method further includes reevaluating, by the processor, the quality-of-service for each of the plurality of communication devices and redesignating if necessary, by the processor, one of the plurality of communication devices as the principal communication device of the plurality of communication devices assigned to the same participant to the conference call based on the reevaluation of the quality-of-service for each of the plurality of communication devices.

The term "conference" as used herein refers to any communication or set of communications, whether including audio, video, text, or other multimedia data, between two or more communication endpoints and/or users. Typically, a conference includes three or more communication endpoints. The terms "conference" and "conference call" are used interchangeably throughout the specification.

The term "communication device" or "communication endpoint" as used herein refers to any hardware device and/or software operable to engage in a communication session. For example, a communication device can be an Internet Protocol (IP)-enabled phone, a desktop phone, a cellular phone, a personal digital assistant, a soft-client telephone program executing on a computer system, etc. IP-capable hard- or softphone can be modified to perform the operations according to embodiments of the present disclosure. Examples of suitable modified IP telephones include the 5600™, 9620™, 9630™, 9640™, 9640G™, 9650™, and Quick Edition telephones and IP wireless telephones of Avaya, Inc.

The term "RTCP" as used herein refers to Real-Time Transport Control Protocol. RTCP is as described in Real-Time Transport Protocol (RTP) specification RFC 3550, dated July 2003, by Schulzrinne et al., available from the Internet Engineering Task Force (IETF) Network Working Group; this document and all other documents describing RTCP are herein incorporated by reference in their entirety for all that they teach. RTCP provides statistics and control information associated with RTP. RTCP help deliver "metadata" about the multimedia being transported by RTP. RTCP messages can be sent over separate ports from the RTP packets. RTCP generally provides feedback about the quality-of-service to the participants in a conference or conference call.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIG. 1. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIG. 3, which is stored on any type of non-transitory, tangible computer readable medium. The data model can include one or more data structures, which may comprise one or more sections that store an item of data A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such as a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

FIG. 6 is a table illustrating a first scenario used in dynamic media switching between different communication devices of a same participant to a conference call based on quality-of-service and performance in managing the conference call according to an embodiment of the present disclosure.

FIG. 8 is a table illustrating a second scenario used in dynamic media switching between different communication devices of a same participant to a conference call based on quality-of-service and performance in managing the conference call according to an embodiment of the present disclosure.

DETAILED DESCRIPTION

Figure 1:
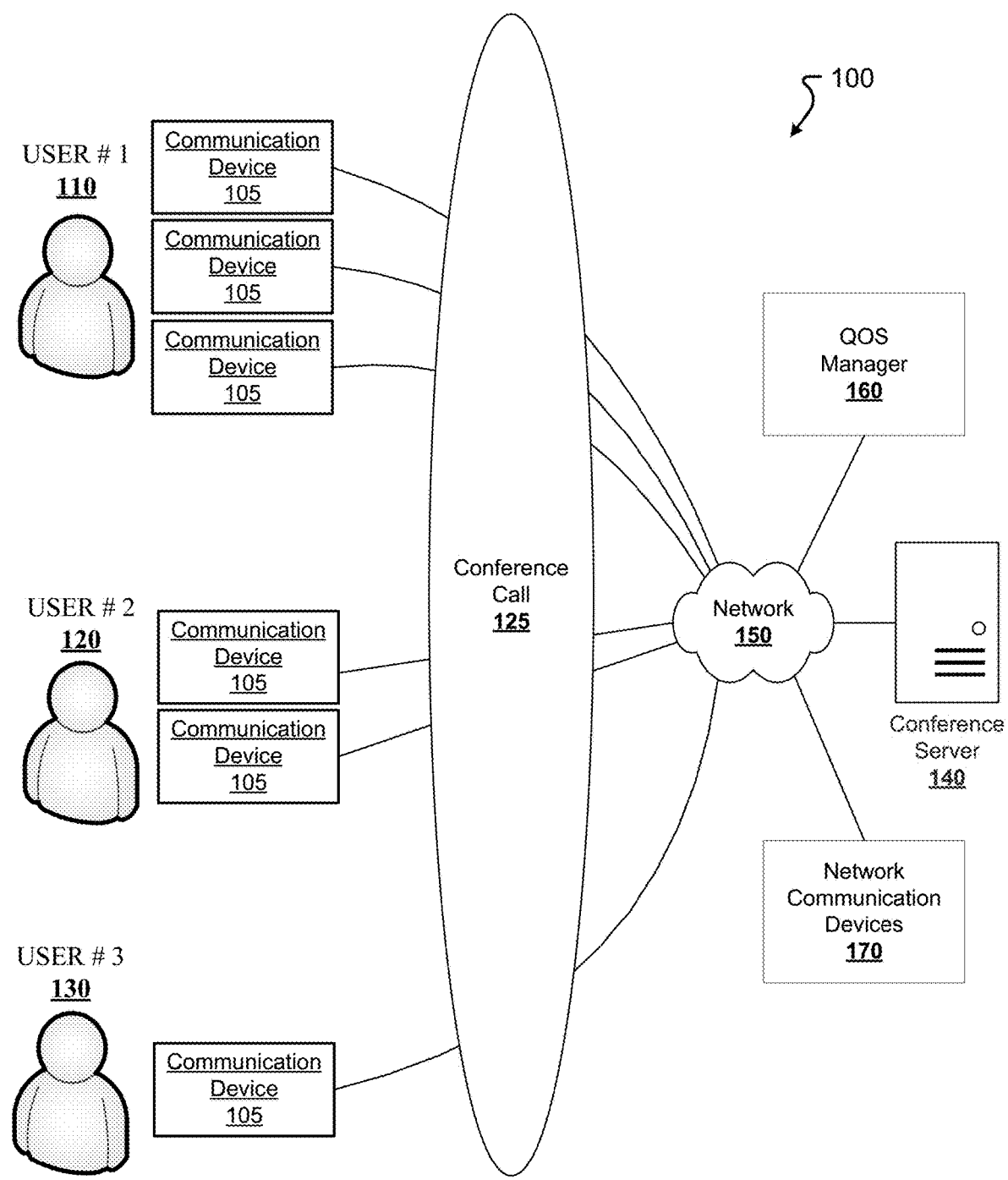
FIG. 1 is a block diagram of an illustrative system for dynamic media switching between different communication devices of a same participant to a conference call based on quality-of-service and performance in managing the conference call according to embodiments of the present disclosure.

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

In some embodiments of the present disclosure, a communication system, such as a conferencing communication system for example, continues to be employed for multiple participants to a conference call (e.g., conferences), augmented with a function that allows a participant with multiple devices to join the conference, that is for example, overlaid on the conferencing communication system. The multiple devices for a participant function may enable selection of one of the multiple devices with the best quality-of-service for use during the conference call while automatically muting the remainder of the multiple devices having a lower quality-of-service. Other factors besides the best quality-of-service can be considered when selecting one of the multiple devices.

Conference calls (also known as teleconferences) are routinely used to communicate interactively among a plurality of persons, referred to as participants. The conference calls may be used by participants in different locations, and in some cases, in remote locations that are dispersed geographically. Commonly, the conference calls are performed over the Internet, for example, by exploiting Voice over Internet Protocol (IP) (VoIP) techniques. The conference calls provide a live exchange of sounds among the participants (i.e., their voices). Moreover, the conference call may also support the sharing of multi-media contents, such as video, images, data, documents and so on.

The effectiveness of each conference call significantly depends on its quality; for example, with reference to corresponding audio channels of the participants (used to transmit/receive sounds), their integrity and fidelity is important to ensure that each participant speaking in the conference call is heard by all the other participants.

The quality of the conference call may change, however, significantly after the conference call has been established. The quality of the audio channel of each participant depends on several factors that are relatively dynamic (such as a speed of a connection with the service provider, a corresponding network traffic and so on). The change of the quality may be critical when the participants are muted (to suppress their voices) after entering the conference call and they are unmuted (to speak into the conference call) only when their speaking turn arrive, which may happen after a relatively long time (especially when the conference call has a high number of participants).

Therefore, it may happen that when a participant speaks into the conference call, the quality of the corresponding audio channel has changed significantly from the moment of entering the conference call. Particularly, the quality of the audio channel may have worsened, for example, because of a reduction of the speed of the connection with the service provider and/or an increase of a corresponding network traffic (down to a complete break). In this case, the voice of the participant may become distorted, intermittent and/or noisy, so as to make it difficult, if not impossible to be understood by the other participants. Moreover, when the participant has more than one device connected to the conference call, it becomes difficult for the participant to know which device provides the best quality-of-service and manage the other devices to prevent interferences from these other devices.

FIG. 1 is a block diagram of an illustrative system 100 for dynamic media switching between different communication devices of a same participant to a conference call based on quality-of-service and performance in managing the conference call according to embodiments of the present disclosure. The illustrative system 100 includes a plurality of users, here a first user 110, a second user 120 and a third user 130, a plurality of communication devices 105, a conference call 125, a network 150, a conference server 140, a quality-of-service (QoS) manager 160 and network communication devices 170. According to one embodiment of the present disclosure, the conference call 125 can be a videoconference or conference call and the conference call 125 is supported by the conference server 140 and the network communication devices 170 and communicates with the QoS manager 160.

A communication device 105 can be or may include any user communication endpoint device that can communicate over the network 150 providing one-way or two-way audio and/or video communication with other communication devices 105 and the conference server 140 and includes a Personal Computer (PC), a telephone, a video system, a cellular telephone, a Personal Digital Assistant (PDA), a tablet device, a notebook device, a laptop, an iPad, a smartphone, and/or the like. The communication devices 105 are devices where a communication session ends. The communication devices 105 are not network elements that facilitate and/or relay information in the network, such as a communication manager or router (for example network communication devices 170). As shown in FIG. 1, any number of communication devices 105 may be connected to the network 150. In one embodiment of the present disclosure, the communication device 105 is a portable (e.g., mobile) device. In another embodiment, the communication device 105 is a stationary device.

As depicted, there is at least one communication device 105 provided for each of the plurality of users 110, 120 and 130 participating in the conference call 125. While not depicted, there may be one or more other communication devices for the users 110, 120 and 130 that do not participate in the conference call 125. The communication devices 105 may provide any combination of several different types of inputs and/or output, such as speech only, speech and data, a combination of speech and video, or a combination of speech, data and video. Information communicated between the communication devices 105 and/or the conference server 140 may include control signals, indicators, audio information, video information, and data.

Network 150 can be or may include any collection of communication equipment that can send and receive electronic communications, such as the Internet, a Wide Area Network (WAN), a Local Area Network (LAN), a VoIP network, the Public Switched Telephone Network (PSTN), a packet switched network, a circuit switched network, a cellular network, a combination of these, and the like. Network 150 can use a variety of electronic protocols, such as Ethernet, IP, Session Initiation Protocol (SIP), Integrated Services Digital Network (ISDN), email protocols, text messaging protocols (e.g., Short Message Service (SMS)), and/or the like. Thus, network 150 is an electronic communication network configured to carry messages via packets and/or circuit switched communications.

Figure 2:
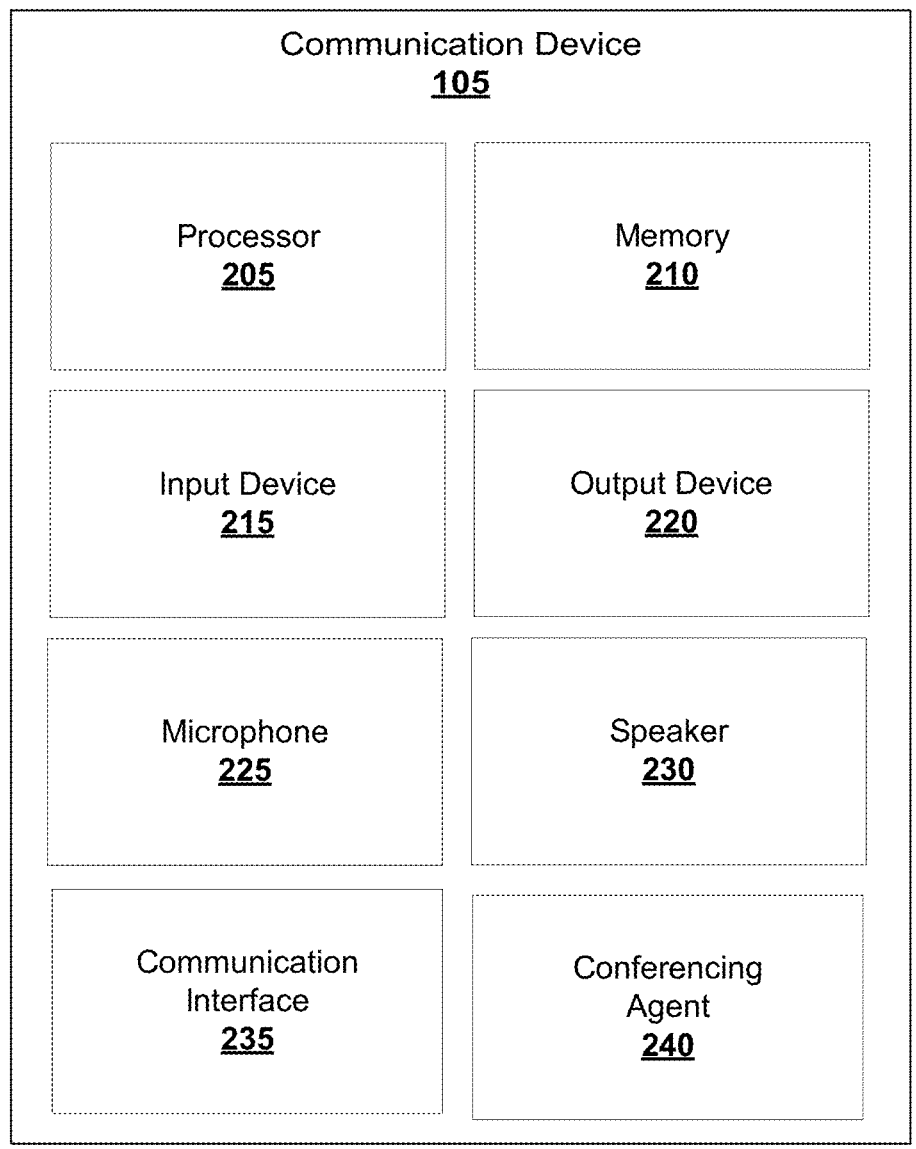
FIG. 2 is a block diagram of an illustrative communication device used in dynamic media switching between different communication devices of a same participant to a conference call based on quality-of-service and performance in managing the conference call according to an embodiment of the present disclosure.

FIG. 2 is a block diagram of an illustrative communication device 105 used in dynamic media switching between different communication devices of a same user based on quality-of-service and performance in managing a conference call according to an embodiment of the present disclosure. The communication device 105 may include a processor 205, a memory 210, an input device 215, an output device 220, a microphone 225, a speaker 230, a communication interface 235 and a conferencing agent 240. The communication device 105 may include a body or an enclosure, with the components of the communication device 105 being located within the enclosure. In various embodiments of the present disclosure, the communication device 105 includes a battery or power supply for providing electrical power to the communication device 105. Moreover, the components of the communication device 105 are communicatively coupled to each other, for example via a computer bus.

The processor 205, in one embodiment of the present disclosure, may include any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, or similar programmable controller. In some embodiments of the present disclosure, the processor 205 executes instructions stored in the memory 210 to perform the methods and routines described herein. The processor 205 is communicatively coupled to the memory 210, the input device 215, the output device 220, the microphone 225, the speaker 230, and the communication interface 235.

The memory 210, in one embodiment of the present disclosure, is a computer readable storage medium. In some embodiments of the present disclosure, the memory 210 includes volatile computer storage media. For example, the memory 210 may include a random-access memory (RAM), including dynamic RAM (DRAM), synchronous dynamic RAM (SDRAM), and/or static RAM (SRAM) In some embodiments of the present disclosure, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments of the present disclosure, the memory 210 stores data relating to managing a conference call. For example, the memory 210 may store physical locations associated with the conference call, devices participating in the conference call, statuses and capabilities of the participating devices, and the like. In some embodiments of the present disclosure, the memory 210 also stores program code and related data, such as an operating system operating on the communication device 105. In one embodiment of the present disclosure, the memory 210 stores program code for a conferencing client used to participate in the conference call.

The input device 215, in one embodiment of the present disclosure, may comprise any known computer input device including a touch panel, a button, a keypad, and the like. In certain embodiments of the present disclosure, the input device 215 includes a camera for capturing image data. In some embodiments of the present disclosure, a user may input instructions via the camera using visual gestures. In some embodiments, the input device 215 (or portions thereof) may be integrated with the output device 220, for example, as a touchscreen or similar touch-sensitive display. In some embodiments, the input device 215 comprises two or more different devices, such as a camera and a touch panel.

The output device 220, in one embodiment of the present disclosure, is configured to output visual, audible, and/or tactile signals. In some embodiments of the present disclosure, the output device 220 includes an electronic display capable of outputting visual data to a user. For example, the output device 220 may include a liquid crystal display (LCD) display, a light emitting diode (LED) display, an organic LED (OLED) display, a projector, or similar display device capable of outputting images, text, or the like to a user. In certain embodiments of the present disclosure, the output device 220 includes one or more speakers for producing sound, such as an audible alert or notification. In some embodiments of the present disclosure, the output device 220 includes one or more tactile devices for producing vibrations, motion, or other tactile outputs.

According to some embodiments of the present disclosure, all or portions of the output device 220 may be integrated with the input device 215. For example, the input device 215 and output device 220 may form a touchscreen or similar touch-sensitive display.

The microphone 225, in one embodiment of the present disclosure, comprises at least one input sensor (e.g., microphone transducer) that converts acoustic signals (sound waves) into electrical signals, thereby receiving audio signals. In various embodiments of the present disclosure, the user inputs sound or voice data (e.g., voice commands) via a microphone array. Here, the microphone 225 picks up sounds (e.g., speech) from one or more conference call participants.

The speaker 230, in one embodiment of the present disclosure, is configured to output acoustic signals. Here, the speaker 230 produces audio output, for example of a conversation or other audio content of a conference call.

The communication interface 235 may include hardware circuits and/or software (e.g., drivers, modem, protocol/network stacks) to support wired or wireless communication between the communication device 105 and another devices or networks, such as the network 150. Here, the communication interface 235 is used to connect the communication device 105 to the conference call. A wireless connection may include a mobile (cellular) telephone network. The wireless connection may also employ a Wi-Fi network based on any one of the Institute of Electrical and Electronics Engineers (IEEE) 802.11 standards. Alternatively, the wireless connection may be a BLUETOOTH™ connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM™), the DASH7™ Alliance, and EPCGlobal™. Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane. Canada.

The wireless connection may be an infrared connection including connections conforming at least to the Infrared Physical Layer Specification (IrPHY) as defined by the Infrared Data Association® (IrDA®) Alternatively, the wireless connection may be a cellular telephone network communication. All standards and/or connection types include the latest version and revision of the standard and/or connection type as of the filing date of this application.

Conference agent 240 controls the conference call that is in progress of the communication device 105. Conference agent 240 is in communication with output device 220 and provides a user interface which may be used by the user to control the conference call.

Figure 3:
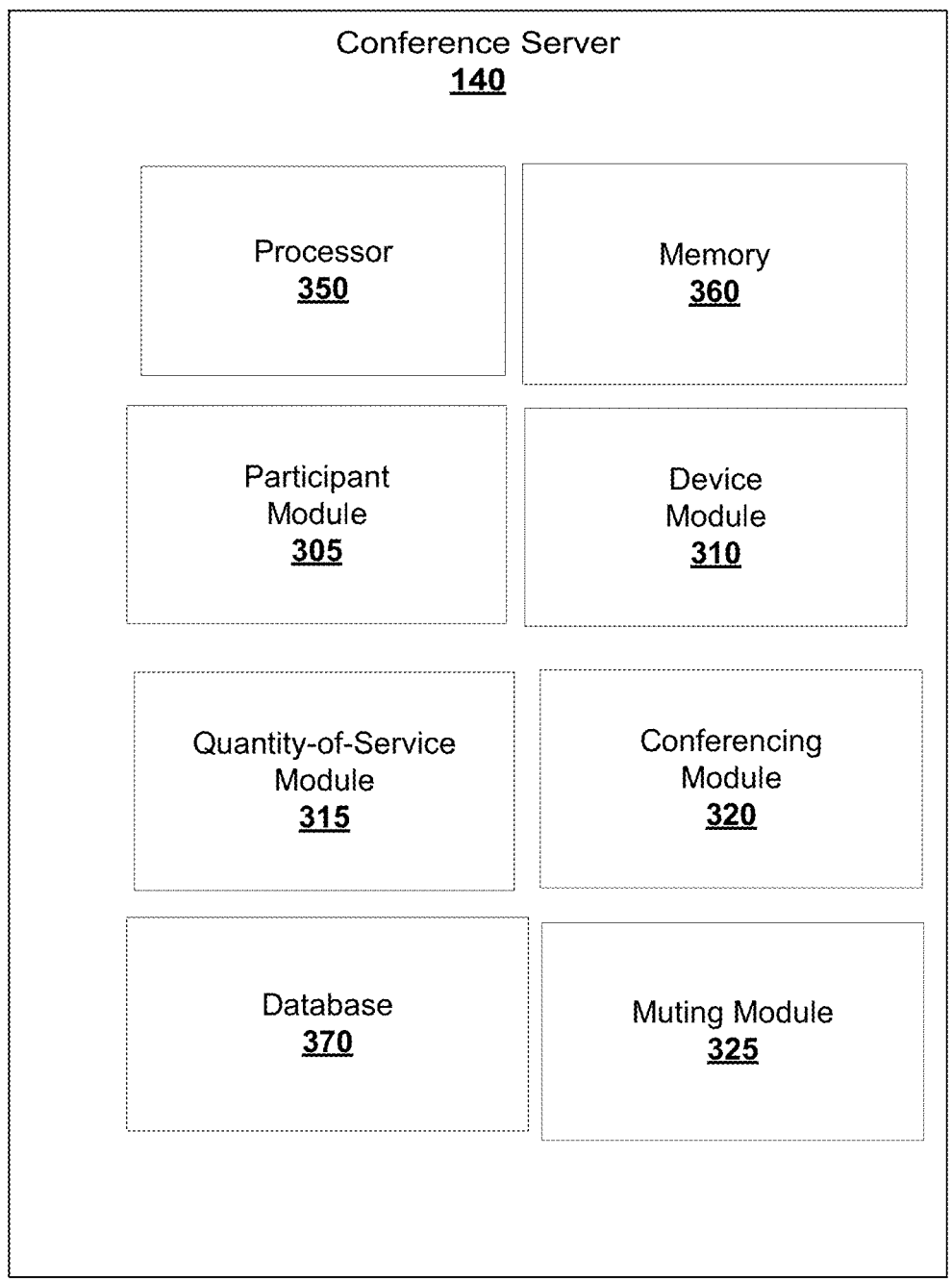
FIG. 3 is a block diagram of an illustrative conference server used in dynamic media switching between different communication devices of a same participant to a conference call based on quality-of-service and performance in managing the conference call according to an embodiment of the present disclosure.

FIG. 3 is a block diagram of an illustrative conference server 140 used in dynamic media switching between different communication devices of a same participant to a conference call based on quality-of-service and performance in managing a conference call according to an embodiment of the present disclosure. The conference server 140 can be or may include any hardware coupled with software that can manage how a conference call is conducted and may include a conference bridge for example. As depicted, the conference server 140 includes a processor 350, a memory 360, a database 370 and one or more of a plurality of modules including a participant module 305, a device module 310, a quality-of-service module 315, a conferencing module 320 and a muting module 325. The modules 305-325 may be implemented as hardware, software, or a combination of hardware and software (e.g., processor 350, memory 360 and database 370).

Processor 350 and memory 360 are similar to processor 205 and memory 210, respectively, as discussed in FIG. 2. Therefore, further discussion of these features has been omitted. The participant module 310, in one embodiment of the present disclosure, is configured to include identifying information about a participant to the conference call. According to one embodiment of the present disclosure, each participant to the conference call is registered as a user to at least one conference provided by the conference server 140. A registered user previously provides identifying information about the user (e.g., a name, a user identity, a unique identifier (ID), an email address, a telephone number, an IP address, etc.), registered communication devices, etc., in memory 360 or database 370. Generally, when a user is invited to a conference call or creates a conference call to become a participant, the user receives a set of information, such as a telephone number and access code or a web conference link, to join the conference. When the time of the conference arrives, the user and the other invited parties must first access the conference dial-in or other information to join the conference. According to one embodiment of the present disclosure, instead of being registered as a user or invited to the conference call provided by the conference server 140, a user can join a conference call as a participant on-the-fly by being authenticated by the conferencing module 320. Authentication involves supplying identifying information and verifying/authenticating the supplied identifying information. Once the supplied identifying information has been verified/authenticated, the identifying information is linked with at least one communication device.

According to an embodiment of the present disclosure, a participant to a conference call can have multiple communication devices participating in the conference call over the same network or have multiple communication devices participating in the conference call each over different networks as discussed in greater detail below. A participant joins the conference call using the multiple communication devices as discussed above using the conference dial-in or other information for each device. Alternatively, a participant can join the conference call on-the-fly after being authenticated. According to an alternative embodiment of the present disclosure, when a participant joins the conference call with one communication device, other communication devices assigned to the participant will be automatically connected to the conference call.

The device module 310, in one embodiment of the present disclosure, is configured to identify each communication device of the plurality of communication devices participating in the conference call. In various embodiments of the present disclosure, each communication device establishes a connection to the conference server 140 in order to participate in the conference call. According to one embodiment of the present disclosure, one of the communication devices of a plurality of communication device assigned to a same participant to the conference call may be a multi-user conferencing device, such as a conference hub or room system console. As used herein, a "multi-user conferencing device" refers to a communication device optimized for simultaneous use by multiple conference call participants Examples of multi-user devices include, but are not limited to, a speakerphone, a conference phone, a teleconferencing hub, and a room system console. In contrast, a "personal device" refers to a conferencing device not optimized for use by multiple users simultaneously. Examples of personal devices include, but are not limited to a telephone, a mobile phone (cellular), a smart phone, a tablet computer, a laptop computer, a handheld computer, and a wearable computer.

The quality-of-service module 315 performs a quality-of-service function that includes comparing communication signals from the communication devices 105 over signal paths of the same or different conferencing legs of a network of the conference call with threshold signal evaluations. As used herein "conferencing legs" maybe the unlink and downlink portion of the communications between the communication devices and the conference server. These threshold signal evaluations may include, for example, excessive background noise levels, insufficient echo return loss, varying signal levels (e.g., signal level mismatch relative to signal levels experienced on other signal paths of the same conferencing leg), distortion, fading, crosstalk, etc. The threshold signal evaluations maybe based on, for example, a predetermined value, a communication device type or some other characteristic of the communication device, a characteristic of the signal path, the number of communication devices assigned to the user involved in the conference call, etc. The threshold signal evaluation can be supplied to the quality-of-service module 315 on a per-signal strength basis, on a per-communication device basis and so forth.

According to one embodiment of the present disclosure, the quality-of-service function is implemented by storing a quality-of-service program in the memory 360 and executing the program by a processor 350. According to an alternative embodiment of the present disclosure, the quality-of-service function is implemented either by the QoS manager 160 or by other network communication devices 170 that supplements and assists the quality-of-service module 315 of the conference server 140.

A measure of the quality-of-service can include measurements of packet delay, jitter, a packet loss, a bandwidth, a latency, or other types of quality-of-service measurements, which may be developed using RTCP or other proprietary mechanisms. Quality-of-service statistics can measure the quality of the communications between the conference server 140 or between the conference server 140 and the communication devices 105. In embodiments of the present disclosure, the quality-of-service module 315 receives reports over the RTCP connection between the conference server 104 and the communication devices 105. This measured information may be compared to a threshold to determine if the quality-of-service measures are meeting a certain predetermined standard for the conference call. The determination or measurements may be provided to the conferencing module 320 to determine which communication device should be selected as a principal communication device as discussed in greater detail below.

According to an alternative embodiment of the present disclosure, the quality-of-service module 315 determines a quality-of-service score based on applying a weight to the conferencing legs of the conferencing call. For example, a higher weight may correspond to a conferencing leg that is receiving the greater audio energy. The weight for a particular conferencing leg receiving the greatest audio energy may be increased while the weights of other conferencing legs may be decreased. The weights of the conferencing legs at any particular time may then be considered by the conferencing module 320 when determining which communication device 105 to select. For example, the conferencing module 320 may focus on or prefer conferencing legs having greater weights rather than those conferencing legs having lessor weights at a particular time.

According to another alternative embodiment of the present disclosure, the quality-of-service module 315 determines a quality-of-service score based on applying weighting factors to the conferencing leg as well as the communication device. For example, a weighted value can be assigned based on a distance between the communication devices 105 and the conference server 140. Weights may be assigned based upon how long ago an action occurred or was detected during the conference call and is a sign of more active participation. Recent speaking may be given more weight than speaking a longer time ago. More continuous speaking may be given more weight than a brief utterance.

A score indicative of the quality-of-service provided by each communication device and communication network may then be calculated, for example, as one or more functions of one or more of the parameters discussed above. This quality-of-service score may be calculated using any combination of lookup tables, graphs, and/or equations. In some embodiments of the present disclosure, one or more of the parameters may be more heavily weighted than other parameters during calculation of the quality-of-service score. According to one example embodiment of the present disclosure, the quality-of-service score may range from 0 to 100, with 0 being indicative of a non-functioning communication device and/or communication network and 100 being indicative of a fully functional or perfect-quality communication device and/or communication network.

After each of the communication devices and conference legs for a conference call has been evaluated, the evaluation is forwarded to the conferencing module 320 which causes a selection of one of the conference legs and one of the communication devices 105. The signal paths of the remaining communication devices 105 are muted as discussed in greater detail below.

According to one embodiment of the present disclosure, after a predetermined period of time has expired, the quality-of-service module 315 performs another quality-of-service function to reevaluate the quality-of-service for each of the plurality of communication devices.

According to one embodiment of the present disclosure, the quality-of-service function could confirm that a previously selected communication device 105 is the best communication device to be used for the conference call. Alternatively, the quality-of-service function could be used to redesignate one of the other plurality of communication devices 105 as a principle communication device of the plurality of communication devices assigned to the same participant to the conference call based on the reevaluation of the quality-of-service for each of the plurality of communication devices 105.

According to one embodiment of the present disclosure, the conference server 104 receives an uplink communication signal from each of the communication devices 105 joined to the conference call. The conference server 104 selects the communication device 105 of multiple communication devices 105 assigned to a same participant with the best quality-of-service for each participant of the conference call. The conference server 104 then mixes the uplink signals from the communication devices 105 with the best quality-of-service. According to the present disclosure, the conference server 104 sends the downlink mixed communication signal to each of the communication devices 105 with the best quality-of-service. These communication devices 105 could be the same communication devices 105 that were selected for the unlink signal. Alternatively, these communication devices 105 are different communication devices

105 that have the best quality-of-service after reevaluating the communication devices 105 before sending the mixed communication signal.

According to further alternative embodiments of the present disclosure, after a threshold value from the selected one of the plurality of communication devices 105 (the principal communication device) drops below a predetermined value, the quality-of-service module 315 performs another quality-of-service function to reevaluate the quality-of-service for each of the plurality of communication devices 105. The quality-of-service function could be used to redesignate one of the other plurality of communication devices 105 as the best communication device of the plurality of communication devices 105 assigned to the same participant to the conference call based on the reevaluation of the quality-of-service for each of the plurality of communication devices 105.

The conferencing module 320, according one to embodiment of the present disclosure, provides a conference call service to users of the communication devices 105 by controlling conference calls that are in progress. The conferencing module 320 accesses database 370 which stores information about persons registered as users to the conference server 140. For example, the database 370 includes a record for each user, which record indicates its name, credentials, network address of the communication device(s) 105 and so on. These records are used or shared by participant module 305 and device module 310. The database 370 stores information about any conference calls that are in progress. For example, the database 370 includes a record for each conference call (in progress), which record indicates its participants; in turn, for each participant the record indicates the network address of the communication device(s) 105 and its current mode (mute/unmute). The database 370 also includes a record of which communication device of a plurality of communication devices of a same participant to the conference call is selected as the principal communication device.

The conferencing module 320 performs a bridge function that mixes the signals from each of the participants to the conference call. The conferencing module 320 receives the quality-of-service evaluations from the quality-of-service module 315 and/or the quality-of-service evaluations from the QoS manager 160. According to an alternative embodiment of the present disclosure, the conferencing module 320 monitors and evaluates signals that are received on signal paths of the conferencing legs from the communication devices 105. Regardless of how the conferencing module 320 receives the evaluations of the quality-of-service of the conferencing legs of the conference call, the conferencing module 320 uses this information as well as an evaluation of the communication devices to determine a quality-of-service score for each of the communication devices. Accordingly, using information from the participant module 305, the device module 310 and the quality-of-service module 315 or the QoS manager 160, the conferencing module 320 determines the quality-of-service score.

According to one embodiment of the present disclosure, the conferencing module 320 reassesses which communication devices 105 are to be muted in response to a new communication device of the same participant joining the conference call. If the new communication device has a higher quality-of-service score than the current principal communication device, then the new communication device becomes the new principal communication device and the previous principal communication device may be muted. Otherwise, if the new communication device does not have a higher quality-of-service score, then the conferencing module 320 automatically mutes the new communication device.

Similarly, the conferencing module 320 may reassess which communication devices are to be muted in response to a communication device being disconnected from the conference call. For example, if the current principal communication device is disconnected from the conference call, then the communication device with the highest quality-of-service score of the remaining communication devices of the same participant to the conference call will be designated as the new principal communication device and automatically unmuted.

According to an alternative embodiment of the present disclosure, the conferencing module 320 uses information stored in the databased 370 along with the quality-of-service score to select one of the communication devices assigned to the same participant to the conference call as the principal communication device. For example, using information from the participant module 305 and the device module 310, conferencing module 320 selects one of the communication devices assigned to the same participant to the conference call as the principal communication device based on the quality-of-service score along with a preferred communication device of the participant, a preferred communication network of the participant, a preferred time of day for a communication device of the participant, a preferred time of day for a communication network of the participant, a preferred number of communication devices joined to the conference call, etc.

As an example, even if the quality-of-service score for one of the communication devices assigned to the same participant to the conference call has the highest score, other factors such as a preferred communication device by the participant can be considered before selecting the communication device with the highest quality-of-service score as the principal communication device. For example, if the communication device with the highest quality-of-service score and a preferred communication device with a lower quality-of-service score are considered for selection, the conferencing module 320 may select the preferred communication device with a lower quality-of-service score as the principal communication device if a threshold value of the lower quality-of-service score for the preferred communication device is not exceeded. As another example, if the communication device with the highest quality-of-service score and a preferred communication network are considered, the conferencing module 320 may select a communication device with the preferred communication network with a lower quality-of-service score as the principal communication device if a threshold value of the lower quality-of-service score of the communication network is not exceeded.

As a further example, if the communication device with the highest quality-of-service score and a preferred time of day for a communication device with a lower quality-of-service score are considered for selection, the conferencing module 320 may select the communication device for a preferred time of day having a lower quality-of-service score as the principal communication device if a threshold value of the lower quality-of-service score for the communication device with the preferred time of time is not exceeded. For example, the participant to the conference call with multiple communication devices, can previously store in database 370 a preference that the iPad is preferred of all the communication devices joined to the conference call from 5:00 p.m. to 8.00 p m. The preference would be weighed by the conferencing module 320 along with the quality-of-service score to select one of the communication devices as the principal communication device.

The muting module 325, according to one embodiment of the present disclosure, is configured to mute an audio device of each of the plurality of communication devices 105, according to the instructions of the conferencing module 320, that is not designated as the principal communication device. In certain embodiments of the present disclosure, the muting module 325 mutes a microphone of a non-principal communication device. In certain embodiments of the present disclosure, the muting module 325 mutes the speaker(s) of a non-principal communication device.

The conference server 140 can include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc. The conference server 140 is preferably configured to execute telecommunication applications such as the suite of MultiVantage™ applications of Avaya, Inc., including Communication Manager™ and MultiVantage Express™. The conference server 140 preferably includes one or more MultiPoint Conferencing Units™, multipoint control unit (MCU)s and/or Meeting Exchange™ of Avaya, Inc., and a suitable conferencing server, such as a 1056-port CS700 Conferencing Server™ of Avaya, Inc. These products typically require the participants to dial into a conference bridge using a predetermined dial-in number and access code to initiate conferences, without an operator or advanced reservations. As will be appreciated, these products further provide integrated features such as audio and web conference management, desktop sharing, polling, interactive whiteboard session, chat, application sharing, conference recording and playback of audio and web portions of the conference, and annotation tools.

Figure 4:
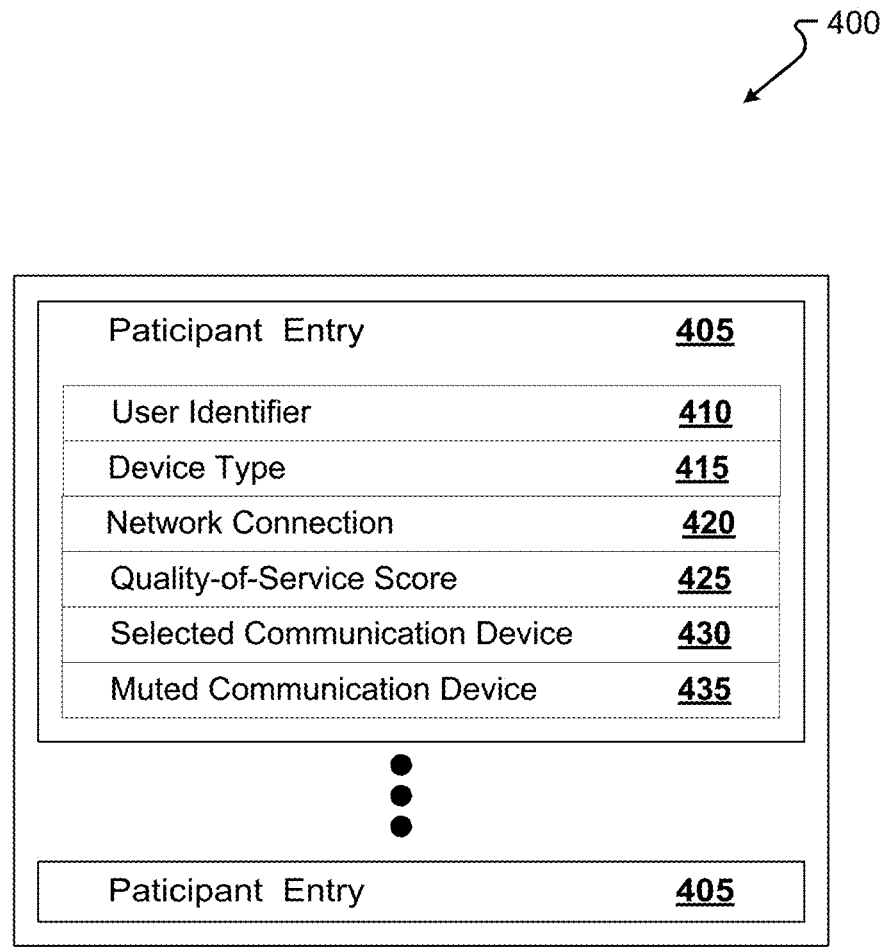
FIG. 4 is a block diagram of a data structure used in dynamic media switching between different communication devices of a same participant to a conference call based on quality-of-service and performance in managing the conference call according to an embodiment of the present disclosure.

FIG. 4 is a block diagram of a data structure 400 used in dynamic media switching between different communication devices of a same participant to a conference call based on quality-of-service and performance in managing a conference call according to an embodiment of the present disclosure. According to one embodiment of the present disclosure, the data structure 400 is created by the conference server 140 and is stored in database 370. The data structure 400 includes various participant entries 405 which includes a participant identifier 410, device type(s) 415, network connection(s) 420, a quality-of-service score 425, a selected communication device 430 and muted communication device(s) 435.

According to one embodiment of the present disclosure, the participant identifier 410 stores the identity of the participant to the conference call. For example, the participant identifier may store a username, a telephone name, a conference call ID or other suitable identifier.

In various embodiments of the present disclosure, the device type(s) 415 indicates how many different communication devices of the same participant to the conference call (linked by the user ID 410) are joined to a particular conference call. Moreover, the device type(s) 415 further indicates if the communication device is a mobile phone, a laptop, iPad, etc. In various embodiments of the present disclosure, the network connection(s) 420 indicates which network(s) a particular communication device identified in device type(s) 415 is connected. According to an embodiment of the present disclosure, the network connection(s) include all the networks for each of the communication devices of the same participant to a conference call.

In various embodiments of the present disclosure, the quality-of-service score 425 indicates the quality-of-service of each of the devices provided in the device type(s) 415. The selected communication device 430 indicates which communication device of the plurality of communication devices joined to the conference call by the same participant is selected as the principal communication device. The muted communication device(s) indicates which communication device(s) of the plurality of communication devices joined to the conference call by the same participant are rendered mute.

Figure 5:
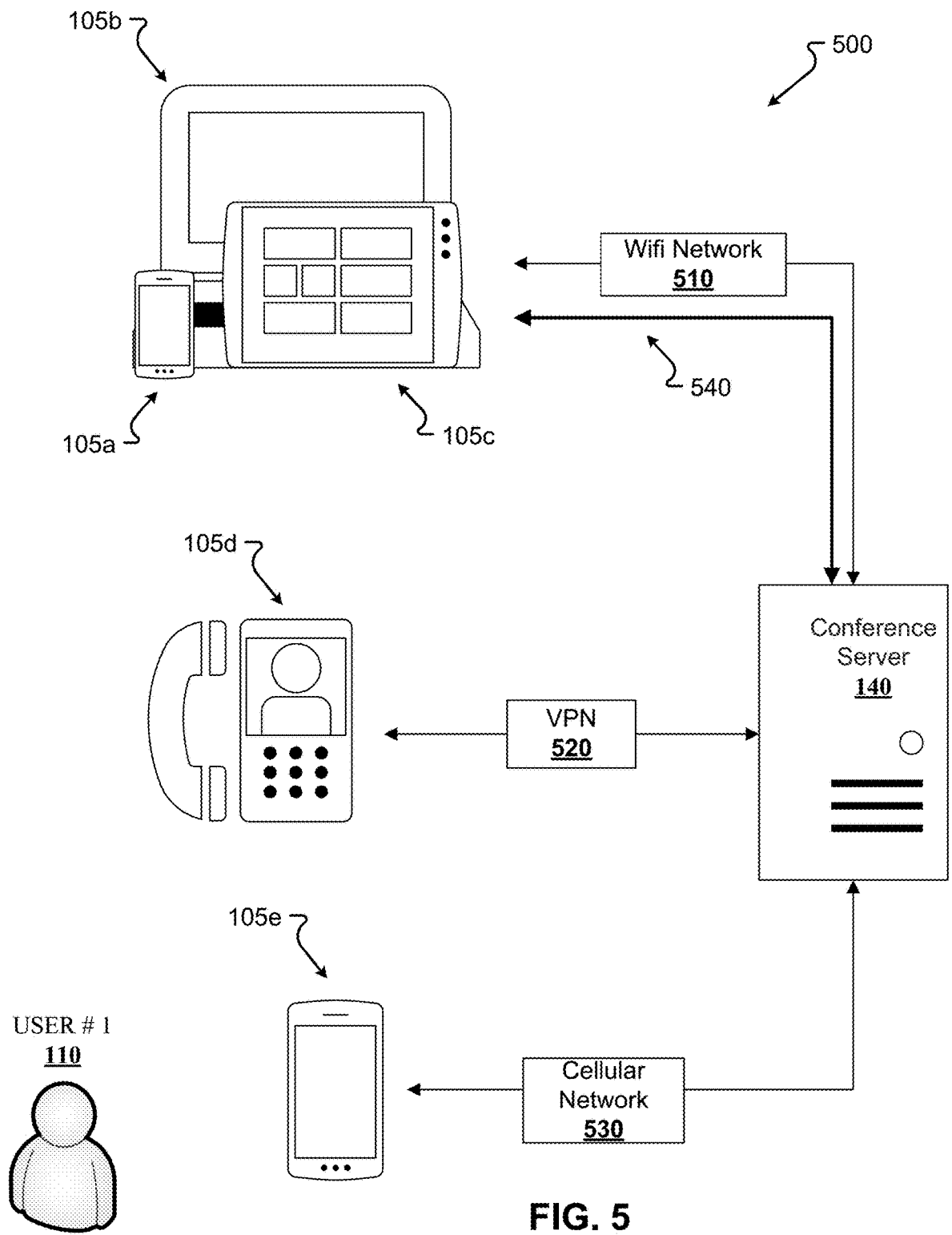
FIG. 5 is a block diagram of an illustrative communication device environment used in dynamic media switching between different communication devices of a same participant to a conference call based on quality-of-service and performance in managing the conference call according to an embodiment of the present disclosure.

FIG. 5 is a block diagram of an illustrative communication device environment 500 used in dynamic media switching between different communication devices 105 of a same participant 110 to a conference call based on quality-of-service and performance in managing the conference call according to an embodiment of the present disclosure. As illustrated in FIG. 5, user 110 (user 1 from FIG. 1) is connected to the conference server 140 with five communication devices 105. Although user 110 is representative of the same participant to the conference call with multiple communication devices, user 120 or user 130 can also be representative of the same participant to the conference call with multiple devices. Although user 130 is shown in FIG. 1 with only one communication device, another communication device can be added later to the conference call either by being joined on-the-fly or being preregistered and later joining as discussed above. Moreover, although user 110 and user 120 are shown with multiple communication devices joined to the conference call, at any point during the conference call, one or more of the communication devices could be dropped from the conference call. In this case, the conferencing module 320 would stop monitoring the participant with only one communication device joined to the conference call and would resume monitoring when more than one communication device for a participant joins the conference call.

Referring back to FIG. 5, the communication devices may include two mobile devices 105a and 105e, a laptop 105b, an iPad 105c and an IP-enable phone 105d. Communication devices 105a-105c are each connected to the conference call supported by conference server 140 via Wi-Fi network 510. Communication device 105d is connected to the conference call supported by conference server 140 via a VPN connection 520. Finally, communication device 105e is connected to the conference call supported by conference server 140 via a cellular network 530. FIG. 6 is a table 600 illustrating a first scenario used in dynamic media switching between different communication devices of a same participant to a conference call based on quality-of-service and performance in managing the conference call according to an embodiment of the present disclosure. As illustrated in FIG. 6, the laptop (communication device 105b) has the highest quality-of-service score of 70. Therefore, communication device 105b is selected as the principal communication device and the remainder of the communication devices 105a and 105c-105d are muted. Referring back to FIG. 5, line 540 indicates that communication device 105b is selected as the principal communication device and therefore the audio IN and OUT is connected only to communication device 105b.

Figure 7:
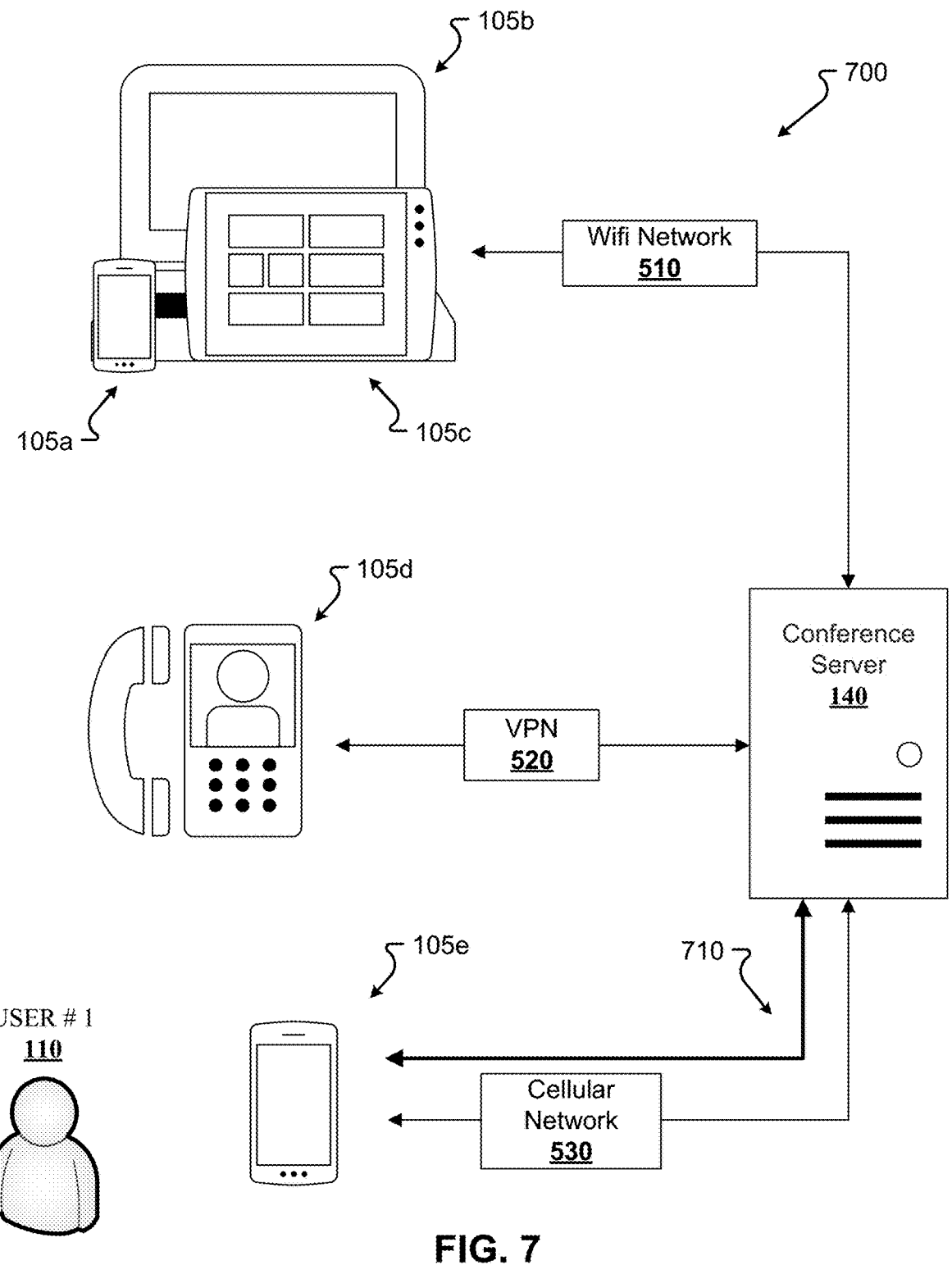
FIG. 7 is a block diagram of an illustrative communication device environment used in dynamic media switching between different communication devices of a same participant to a conference call based on quality-of-service and performance in managing the conference call according to an embodiment of the present disclosure.

FIG. 7 is a block diagram of an illustrative communication device environment 700 used in dynamic media switching between different communication devices of a same participant to a conference call based on quality-of-service and performance in managing the conference call according to an embodiment of the present disclosure. As illustrated in FIG. 7, user 110 (user 1 from FIG. 1) is connected to the conference server 140 with five communication devices 105a-105e. The communication devices may include two mobile devices 105a and 105e, a laptop 105b, an iPad 105c and an IP-enable phone 105d. Communication devices 105a-105c are each connected to the conference call supported by conference server 140 via Wi-Fi network 510. Communication device 105d is connected to the conference call supported by conference server 140 via a VPN connection 520. Finally, communication device 105e is connected to the conference call supported by conference server 140 via a cellular network 530.

FIG. 8 is a table 800 illustrating a second scenario used in dynamic media switching between different communication devices of a same participant to a conference call based on quality-of-service and performance in managing the conference call according to an embodiment of the present disclosure. As illustrated in FIG. 8, the mobile device (communication device 105e) has the highest quality-of-service score of 80. Therefore, communication device 105e is selected as the principal communication device and the remainder of the communication devices 105a-105d are muted. Referring back to FIG. 7, line 710 indicates that communication device 105e is selected as the principal communication device and therefore the audio IN and OUT is connected only to communication device 105e.

Figure 9:
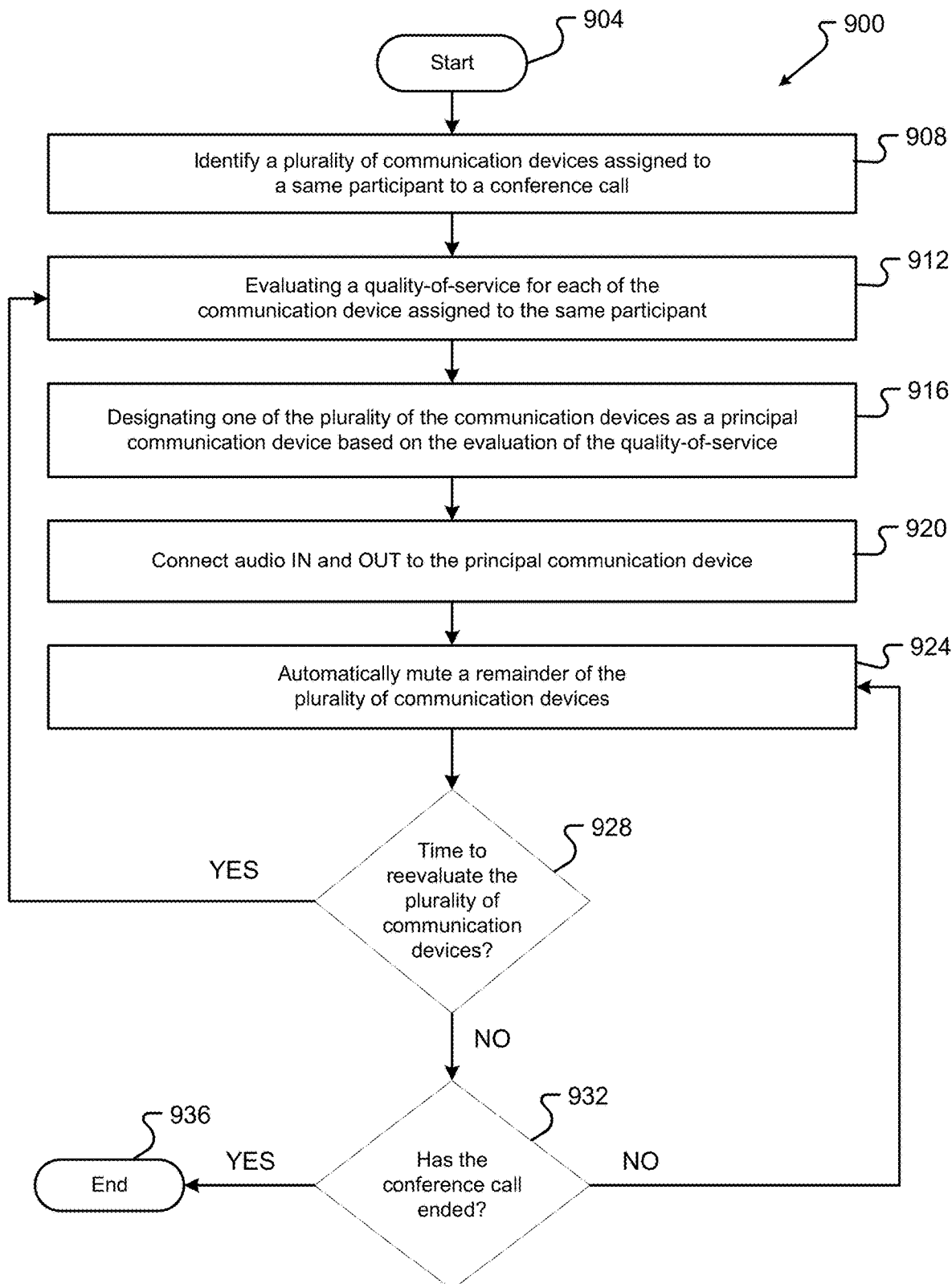
FIG. 9 is a flow diagram of a method used in dynamic media switching between different communication devices of a same participant to a conference call based on quality-of-service and performance in managing the conference call according to an embodiment of the present disclosure.

FIG. 9 is a flow diagram of a method 900 used in dynamic media switching between different communication devices of a same participant to a conference call based on quality-of-service and performance in managing a conference call according to an embodiment of the present disclosure. While a general order of the steps of method 900 is shown in FIG. 9, method 900 can include more or fewer steps or can arrange the order of the steps differently than those shown in FIG. 9. Further, two or more steps may be combined into one step. Generally, method 900 starts with a START operation at step 904 and ends with an END operation at 936. Method 900 can be executed as a set of computer-executable instructions executed by a data-processing system and encoded or stored on a computer readable medium. Hereinafter, method 900 shall be explained with reference to systems, components, modules, software, data structures, user interfaces, etc. described in conjunction with FIGS. 1-8.

Method 900 starts with the START operation at step 904 and proceeds to step 908, where the processor 350 of conference server 140 identifies a plurality of communication devices assigned to a same participating to a conference call. According to an alternative embodiment of the present disclosure, a participant to the conference call may have pre-stored information in database 370 of each of the communication devices to be participating in the conference call. The processor 350 would then retrieve the pre-stored information. After identifying a plurality of communication devices assigned to a same participant to a conference call at step 908, method 900 proceeds to step 912, where the processor 350 of the conference server 140 evaluates a quality-of-service for each of the plurality of communication devices assigned to the same participant to the conference call. The quality-of-service can either be performed by the quality-of-service module 315, the conferencing module 320 and/or the QoS manager 160. After evaluating the quality-of-service for each of the plurality of communication device assigned to the same participant to the conference call at step 912, method 900 proceeds to step 916, where the processor 350 of the conference server 140 designates one of the plurality of communication devices as a principle communication device based on the evaluation of the quality-of-service of the plurality of communication devices. After designating one of the plurality of communication devices as the principal communication device based on the evaluation of the quality-of-service of the plurality of communication devices at step 916, method 900 proceeds to step 920, where the processor 350 of the conference server 140 connects the audio IN and OUT to the principle communication device such that the conference server 140 can send/receive audio to/from the principle communication device. After connecting the audio IN and Out to the principal communication device at step 920, method 900 proceeds to step 924, where the processor 350 of the conference server 140 automatically mutes a remainder of the plurality of communication devices not selected as the principal communication device. After automatically muting the remainder of the plurality of communication devices at step 924, method 900 proceeds to decision step 928, where the processor 350 of the conference server 140 determines whether it is time to reevaluate the quality-of-service of the plurality of communication devices assigned to the same participant to the conference call. If it is time to reevaluate the quality-of-service of the plurality of communication devices assigned to the same participant to the conference call (YES) at decision step 928, method 900 returns to step 912 where the processor 350 of the conference server 140 reevaluates a quality-of-service for each of the plurality of communication devices assigned to the same participant to the conference call. If it is not time to reevaluate the quality-of-service of the plurality of communication devices assigned to the same participant to the conference call (NO) at decision step 928, method 900 proceeds to decision step 932, where the processor 350 of the conference server 140 determines if the conference call has ended. If the conference call has ended (YES) at decision step 932, method 900 ends at END operation 936. If the conference call has not ended (NO) at decision step 932, method 900 returns to step 924, where the processor 350 of the conference server 140 continues to automatically mute a remainder of the plurality of communication devices.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a CPU with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), ROM, programmable read-only memory (PROM), erasable programmable read-only memory (EPROM), RAM, bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion coprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to communications systems and components and methods for monitoring, enhancing, and embellishing communications and messages. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
identifying, by a processor, a plurality of communication devices assigned to a same participant to a conference call;
evaluating, by the processor, a quality-of-service for each of the plurality of communication devices assigned to the same participant to the conference call;
designating, by the processor, one of the plurality of communication devices as a principal communication device of the plurality of communication devices assigned to the same participant to the conference call based on the evaluation of the quality-of-service of the plurality of communication devices;
automatically muting, by the processor, a remainder of the plurality of communication devices not designated as the principal communication device;
reevaluating, by the processor, the quality-of-service for each of the plurality of communication devices; and
redesignating if necessary, by the processor, one of the plurality of communication devices as the principal communication device of the plurality of communication devices assigned to the same participant to the conference call based on the reevaluation of the quality-of-service for each of the plurality of communication devices.

2. The method according to claim 1, wherein automatically muting a remainder of the plurality of communication devices not designated as the principal communication device includes muting a microphone and muting a speaker.

3. The method according to claim 1, wherein identifying the plurality of communication devices assigned to the same participant to the conference call comprises retrieving stored information for the participant.

4. The method according to claim 1, wherein identifying the plurality of communication devices assigned to the same participant to the conference call comprises associating a username with the plurality of communication devices.

5. The method according to claim 1, wherein the plurality of communication devices assigned to the same participant to the conference call communicate over different communication networks.

6. The method according to claim 1, further comprising evaluating at least one participant preference to designate one of the plurality of communication devices as the principal communication device.

7. The method according to claim 6, wherein the at least one participant preference includes a preferred communication device of the plurality of communication devices.

8. The method according to claim 6, wherein the at least one participant preference includes a preferred communication network for one of the communication devices of the plurality of communication devices.

9. The method according to claim 6, wherein the at least one participant preference includes a preferred communication time of day for one of the communication devices of the plurality of communication devices.

10. The method according to claim 1, further comprising:
joining a new communication device to the plurality of communication devices assigned to the same participant to the conference call;
reevaluating, by the processor, the quality-of-service for each of the plurality of communication devices including the newly joined communication device; and
redesignating if necessary, by the processor, one of the plurality of communication devices including the newly joined communication device as the principal communication device assigned to the same participant to the conference call based on the reevaluation of the quality-of-service for each of the plurality of communication devices assigned to the same participant to the conference call.

11. The method according to claim 1, further comprising:
disconnecting one of the plurality of communication devices assigned to the same participant to the conference call;
reevaluating, by the processor, the quality-of-service for each of a remaining number of the plurality of communication devices connected to the conference call; and
redesignating if necessary, by the processor, one of the plurality of communication devices of the remaining number of the plurality of communication devices connected to the conference call as the principal communication device assigned to the same participant to the conference call based on the reevaluation of the quality-of-service for each of the remaining number of the plurality of communication devices connected to the conference call.

12. An apparatus, comprising:
a memory; and
at least one processor, coupled to the memory, operative to:
identify a plurality of communication devices assigned to a same participant to a conference call;
evaluate a quality-of-service for each of the plurality of communication devices assigned to the same participant to the conference call;
designate one of the plurality of communication devices as a principal communication device of the plurality of communication devices assigned to the same participant to the conference call based on the evaluation of the quality-of-service of the plurality of communication devices;
automatically mute a remainder of the plurality of communication devices not designated as the principal communication device;
reevaluate the quality-of-service for each of the plurality of communication devices; and
redesignate, if necessary, one of the plurality of communication devices as the principal communication device of the plurality of communication devices assigned to the same participant to the conference call based on the reevaluation of the quality-of-service for each of the plurality of communication devices.

13. The apparatus according to claim 12, wherein the at least one processor, coupled to the memory, is operative to mute a microphone and a speaker to automatically mute a remainder of the plurality of devices not designated as the principal device.

14. The apparatus according to claim 12, wherein the at least one processor, coupled to the memory, is operative to retrieve stored information for the participant to identify the plurality of communication devices assigned to the same participant to the conference call.

15. The apparatus according to claim 12, wherein the at least one processor, coupled to the memory, is operative to associate a username with the plurality of communication devices to identify the plurality of communication devices assigned to the same participant to the conference call.

16. The apparatus according to claim 12, wherein the plurality of communication devices assigned to the same participant to the conference call communicate over different communication networks.

17. The apparatus according to claim 12, wherein the at least one processor, coupled to the memory, is operative to further evaluate at least one participant preference to designate one of the plurality of communication devices as the principal communication device.

18. The apparatus according to claim 17, wherein the at least one participant preference includes a preferred communication device of the plurality of communication devices.

19. The apparatus according to claim 17, wherein the at least one participant preference includes a preferred communication network for one of the communication devices of the plurality of communication devices.

20. A computer-readable storage device having instructions stored thereon that, in response to execution, cause a processor to perform operations comprising:
   identify a plurality of communication devices assigned to a same participant to a conference call;
   evaluate a quality-of-service for each of the plurality of communication devices assigned to the same participant to the conference call;
   designate one of the plurality of communication devices as a principal communication device of the plurality of communication devices assigned to the same participant to the conference call based on the evaluation of the quality-of-service of the plurality of communication devices;
   automatically mute a remainder of the plurality of communication devices not designated as the principal communication device;
   reevaluate the quality-of-service for each of the plurality of communication devices; and
   redesignate, if necessary, one of the plurality of communication devices as the principal communication device of the plurality of communication devices assigned to the same participant to the conference call based on the reevaluation of the quality-of-service for each of the plurality of communication devices.

* * * * *